United States Patent
Sandstad

(10) Patent No.: US 12,408,636 B2
(45) Date of Patent: Sep. 9, 2025

(54) FISH CAGE WITH IMPROVED WATER EXCHANGE AND FARMING CONDITION

(71) Applicant: SFS Group AS, Stavanger (NO)

(72) Inventor: Alf Reidar Sandstad, Stavanger (NO)

(73) Assignee: SFS Group AS, Stavanger (NO)

( * ) Notice: Subject to any disclaimer, the term of this patent is extended or adjusted under 35 U.S.C. 154(b) by 0 days.

(21) Appl. No.: 17/439,031

(22) PCT Filed: Mar. 13, 2020

(86) PCT No.: PCT/NO2020/050068
§ 371 (c)(1),
(2) Date: Sep. 14, 2021

(87) PCT Pub. No.: WO2020/190146
PCT Pub. Date: Sep. 24, 2020

(65) Prior Publication Data
US 2022/0159935 A1    May 26, 2022

(30) Foreign Application Priority Data
Mar. 15, 2019 (NO) .................................. 20190355

(51) Int. Cl.
*A01K 61/13* (2017.01)
*A01K 61/60* (2017.01)
*A01K 63/04* (2006.01)

(52) U.S. Cl.
CPC .............. *A01K 61/13* (2017.01); *A01K 61/60* (2017.01); *A01K 63/04* (2013.01)

(58) Field of Classification Search
CPC ........ A01K 61/13; A01K 61/60; A01K 63/04; A01K 61/10

(Continued)

(56) References Cited

U.S. PATENT DOCUMENTS

| | | | | |
|---|---|---|---|---|
| 4,655,169 A | * | 4/1987 | Pullola | A01K 63/10 119/228 |
| 6,216,635 B1 | * | 4/2001 | McRobert | A01K 61/60 119/201 |

(Continued)

FOREIGN PATENT DOCUMENTS

| | | |
|---|---|---|
| CN | 205794502 U | * 12/2016 |
| GB | 2200822 | 8/1988 |

(Continued)

OTHER PUBLICATIONS

Norwegian Search Report for NO 20190355, dated Aug. 9, 2019.

(Continued)

*Primary Examiner* — Kimberly S Berona
*Assistant Examiner* — Kevin M Dennis
(74) *Attorney, Agent, or Firm* — Andrus Intellectual Property Law, LLP

(57) ABSTRACT

A cage is for farming fish. The cage floats in a water column and the upper portion of the cage has a surrounding floating body arranged to float in a water surface. An enclosure is located between the upper portion and the lower portion of the cage, the enclosure being closed in its lower portion and forming an inside and an outside. The cage has a liquid-tight wall which is attached to the floating body and which extends from the water surface downwards in the water column. The liquid-tight wall forms a lower edge portion. The cage is provided, in its upper portion, with at least one flow booster for creating a circular water current within the liquid-tight wall. A method for creating an upward water current of fresh water within the cage is also provided.

18 Claims, 7 Drawing Sheets

(58) Field of Classification Search
USPC .................................................. 119/215, 223
See application file for complete search history.

(56) References Cited

U.S. PATENT DOCUMENTS

| | | | | |
|---|---|---|---|---|
| 10,918,094 | B2* | 2/2021 | Sandstad | A01K 61/60 |
| 11,523,593 | B2* | 12/2022 | Krogenes | A01K 61/80 |
| 2010/0170450 | A1* | 7/2010 | Bradley | A01K 63/042 |
| | | | | 119/261 |
| 2013/0112151 | A1* | 5/2013 | Mizrachi | A01K 61/60 |
| | | | | 119/226 |
| 2019/0166808 | A1* | 6/2019 | Sandstad | A01K 61/10 |

FOREIGN PATENT DOCUMENTS

| | | |
|---|---|---|
| NO | 165901 | 1/1991 |
| NO | 327035 | 4/2009 |
| NO | 20140350 | 9/2015 |
| NO | 341377 | 10/2017 |
| NO | 341377 B1 | 10/2017 |
| NO | 342818 | 8/2018 |
| NO | 342948 | 9/2018 |
| NO | 342948 B1 | 9/2018 |
| NO | 343181 | 11/2018 |
| NO | 20171229 | 1/2019 |
| NO | 343362 | 2/2019 |
| NO | 343600 | 4/2019 |
| NO | 346521 B1 | 9/2022 |
| RU | 81622 | 3/2009 |
| SE | 464217 | 3/1991 |
| WO | 2014000102 | 1/2014 |
| WO | 2017155414 | 9/2017 |
| WO | WO-2017155414 A1 * | 9/2017 ............. A01K 61/60 |
| WO | 2019045573 | 3/2019 |

OTHER PUBLICATIONS

International Search Report and the Written Opinion for PCT/NO2020/050068, dated May 14, 2020.
Response to the First Written Opinion for PCT/NO2020/050068, dated Jan. 13, 2021.
The Second Written Opinion for PCT/NO2020/050068, dated Feb. 22, 2021.
Response to the Second Written Opinion for PCT/NO2020/050068, dated Apr. 22, 2021.
International Preliminary Report on Patentability for PCT/NO2020/050068, dated May 10, 2021.
Aquatraz Tekmar presentation dated Dec. 5, 2018. See in particular pp. 8 and 18 of the English translation.
PUFAB Pumperfabrikken memo having latest revision date of Nov. 24, 2020 and first date of Jul. 5, 2017.
PUFAB Pumperfabrikken Opposition/Objection to NO346521 dated May 30, 2023.
Notice of Reasons for Refusal issued in Corresponding Japanese Patent Application No. 2021-553324, dated Mar. 7, 2023.

* cited by examiner

FISH CAGE WITH IMPROVED WATER EXCHANGE AND FARMING CONDITION

CROSS-REFERENCE TO RELATED APPLICATIONS

This application is the U.S. national stage application of International Application PCT/NO2020/050068, filed Mar. 13, 2020, which international application was published on Aug. 27, 2020, as International Publication WO 2020/190146 in the English language. The International Application claims priority of Norwegian Patent Application No. 20190355, filed Mar. 15, 2019. The international application and Norwegian application are both incorporated herein by reference, in entirety.

BACKGROUND AND SUMMARY

This invention relates to a cage for farming fish. More specifically, the invention relates to a cage which is partially closed in such a way that at least the upper portion of the cage is provided with a liquid-tight wall. According to the invention, the cage is provided with at least one flow booster at its upper portion. The flow booster induces a circular current which creates an overpressure along the liquid-tight wall, thereby contributing to keeping the liquid-tight wall stretched or, possibly, pushing the liquid-tight wall against an enclosure on the outside of the liquid-tight wall. According to the invention, the circular current will form a portion at the center of the cage with a lower hydrodynamic pressure than the surrounding hydrodynamic pressure, which will create an upward water current at the center of the cage. At the upper and peripheral portion of the cage, an overpressure is created, compared with the surrounding hydrodynamic pressure, and the water will flow out of the cage through openings in this portion. The invention also comprises regulating the outlet of the cage by providing the liquid-tight wall with an inward-projecting border. By limiting the amount of water pumped through the cage, the energy consumption necessary for maintaining the circular flow in the cage is reduced, and the energy consumption is reduced. The border further helps a larger portion of the volume in the cage to achieve good circulation. When a border is used at the bottom, the circulating water current will extend all the way down to the border. The well-being of fish in the cage will be improved because of the circular water current, and because of the intake of large amounts of fresh water from under the cage at the center of the cage.

The farming of fish may take place in so-called open cages. An open cage comprises a closed enclosure which is kept afloat by a surrounding floating body. The closed enclosure may comprise a net or a seine, so that the fish is confined in the enclosure, and so that water with dissolved oxygen may flow through the enclosure. The enclosure is closed in the submerged part, and the enclosure projects above the water surface by a so-called jump net to prevent the fish from escaping from the enclosure. The enclosure is open to air, but the enclosure may be covered by a so-called bird net. The cage is provided with a mooring system and with a feeding system.

Farming may also take place in so-called closed cages. A closed cage comprises a liquid-tight wall and a liquid-tight bottom. The liquid-tight material in the wall and bottom may be a material in cloth form or a rigid material. The rigid material may comprise fibreglass, a multi-layer material, concrete or a metal, such as steel. A closed system is supplied with water by pumping water from the surroundings into the closed cage. The closed cage may be provided with an outlet in a bottom portion or in the wall.

A drawback of open cages is that organisms that may cause disease in the fish are floating into the cage together with the water. This is particularly the case with larvae of the parasite salmon louse. Providing open cages with so-called lice skirts is known. This may be a fine-meshed cloth surrounding the cage on the outside of the floating body and extending downwards in the water column to a depth at which the number of salmon-louse larvae is small or salmon-louse larvae are completely absent. It is also known to use lice skirts of a liquid-tight material like a tarpaulin.

In connection with so-called bath treatment of the fish in the cage, it is known to extend a tarpaulin around the cage on the outside and also all the way or partly under the cage to create as limited a volume as possible for the bath-treatment agent to be spread in.

Patent NO 165901 discloses a device for farming fish in a box that is submerged in water. The box comprises an upper portion of a water-tight material and a lower portion with an outlet portion. Fresh water is introduced in the upper portion of the box so that a relatively slow downward water current is created in the box. Patent NO 341377 discloses a cage with an enclosure formed of a net. A skirt surrounds the cage on the outside of the net, and the skirt extends to an area above a bottom ring. A flow booster inside the cage sucks water from below the skirt and distributes the water inside the cage into the upper water masses. The outlet of the flow booster is directed horizontally and sets the upper water masses into rotation. Patent NO 343600 discloses a water-tight screen which is attached on the inside of a net wall in a fish-farming cage. Patent NO 343181 discloses a cage which is surrounded, in an upper portion, by a lice skirt for the formation of a semi-closed cage. An air-supply member is placed in an area in the vicinity of the bottom ring and remotely from the center of the cage. Pressurized air is supplied to the air-supply member, and air bubbles rising upwards create an upward water current inside the cage.

The invention has for its object to remedy or reduce at least one of the drawbacks of the prior art or at least to provide a useful alternative to the prior art.

The object is achieved through the features that are specified in the description below and in the claims that follow.

The invention is defined by the independent claims. The dependent claims define advantageous embodiments of the invention.

In a first aspect, the invention relates, more specifically, to a cage for farming fish, the cage forming an upper portion and a lower portion and the cage floating in a water column, and the cage comprising:

a surrounding floating body at the upper portion of the cage, the surrounding floating body being arranged to float in a water surface; and an enclosure between the upper portion and the lower portion of the cage, the enclosure being closed in the lower portion of the cage, and the enclosure forming an inside and an outside. The cage comprises a liquid-tight wall which is attached to the floating body, and which extends from the water surface downwards in the water column, and the liquid-tight wall forms a lower edge portion; and the cage is provided, in its upper portion, with at least one flow booster for creating a circular water current within the liquid-tight wall. The flow booster is supplied with water from a portion within the inside of the upper portion of the cage.

The flow booster may comprise a water jet. The water jet may suck water from the inside of the enclosure. The flow booster may comprise an ejector. The driving fluid of the ejector may be taken from the inside of the enclosure. The flow booster may comprise a propeller. The flow booster may comprise a thruster.

According to the invention, the circular current inside the cage will create a portion at the center of the cage with a lower hydrodynamic pressure than the surrounding hydrodynamic pressure. This will create an upward water current at the center of the cage. The upward water current enters at the center of the cage in the lower portion of the cage. The water flows upwards inside the enclosure, and the water may flow out of openings in the liquid-tight wall where the hydrodynamic pressure on the inside of the liquid-tight wall is higher than on the outside of the cage. The water may flow out of openings in the liquid-tight wall in the upper portion of the cage.

The enclosure may comprise a net, and the net may be attached to the lower edge portion. In an alternative embodiment, the enclosure may comprise a net, and the net may be attached to the surrounding floating body, and in such a way that the liquid-tight wall is positioned on the inside of the net. The liquid-tight wall may form the inside of the enclosure in the upper portion of the cage. In this embodiment, the lower edge portion may be attached to the net. This has the advantage of not allowing fish to swim in between the liquid-tight wall and the net. The liquid-tight wall may be positioned on the outside of the net.

The liquid-tight wall may form a cylindrical portion between the upper portion and the lower portion, and a bottom net extends downwards in the water column from the lower edge portion.

The liquid-tight wall may be provided, in the lower edge portion, with a surrounding border, projecting inwards towards the center of the cage. The surrounding border may extend inwards for a fourth of the radius of the cage given by the upper portion of the cage. The surrounding border may extend inwards for a third of the radius of the cage given by the upper portion of the cage. The surrounding border may extend inwards for half the radius of the cage given by the upper portion of the cage. The surrounding border may extend inwards for more than half the radius of the cage given by the upper portion of the cage, such as for ⅔, ¾, ⅘ or even more. The surrounding border does not extend further inwards than for there to be a sufficient opening for the supply of water to the upward water current at the center of the cage. The border may slope downwards towards the center of the cage. The border may slope upwards towards the center of the cage. The border may be oriented horizontally.

In an upper wall portion, the liquid-tight wall may be provided with at least one closable opening for outflow of water from the upper portion of the cage, and the opening may be provided with a means for retaining the fish. The open area of the opening may be adjustable. The means may comprise a fine-meshed net or a grid. In a lower portion, the liquid-tight wall may be provided with at least one opening for outflow of water from the cage. The opening may be provided with a means for retaining the fish. The open area of the opening may be adjustable. The opening may be closable.

In a second aspect, the invention relates to a method for creating an upward central water current of fresh water inside an enclosure in a cage for farming fish, the cage forming an upper portion and a lower portion, and the cage floating in a water column, and the cage comprising:

a surrounding floating body at the upper portion of the cage, the surrounding floating body being arranged to float in a water surface; and an enclosure between the upper portion and the lower portion of the cage, the enclosure being closed in its lower portion, and the enclosure forming an inside and an outside. The method is characterized by the cage being provided with a liquid-tight wall which is attached to the floating body and which extends from the water surface downwards in the water column, the liquid-tight wall forming a lower edge portion; and the cage being provided, in its upper portion, with at least one flow booster which is supplied with water from the inside of the enclosure to create a circular water current within the liquid-tight wall;

the circular water current creating a portion at the center of the cage in the lower portion of the cage with a lower hydrodynamic pressure than the ambient pressure so that water will flow into the lower portion of the cage below the edge portion and upwards in the cage in the upward central water current; and the circular water current creating a hydrodynamic pressure which is larger than the ambient pressure at the periphery of the cage, so that the water will flow out of the cage through an opening in the liquid-tight wall.

The liquid-tight wall may form the inside of the enclosure in the upper portion.

The water may flow out of the cage through an opening in the liquid-tight wall in the upper portion of the cage. The water may flow out of the cage through an opening positioned in the lower edge portion of the liquid-tight wall. The water may flow out of the cage through an opening positioned between the lower edge portion of the liquid-tight wall and the floating ring.

A cage for farming fish is also described, wherein the cage may form an upper portion and a lower portion and the cage may float in a water column, and wherein the cage may comprise:

a surrounding floating body at the upper portion of the cage, the surrounding floating body being arranged to float in a water surface; and an enclosure between the upper portion and the lower portion of the cage, the enclosure being closed in its lower portion, and the enclosure forming an inside and an outside. The cage may comprise a liquid-tight wall which is attached to the floating body, and which extends from the water surface downwards in the water column, and the liquid-tight wall forms a lower edge portion;

the cage being provided, in its upper portion, with at least one flow booster for creating a circular water current within the liquid-tight wall; and the liquid-tight wall being provided, in the lower edge portion, with a surrounding border projecting inwards towards the center of the cage. The flow booster is supplied with water from a portion within the inside of the upper portion of the cage.

The liquid-tight wall may form the inside of the enclosure in the upper portion.

The flow booster may comprise a water jet. The water jet may suck water from the inside of the enclosure. The flow booster may comprise an ejector. The driving fluid of the ejector may be taken from the inside of the enclosure. The flow booster may comprise a propeller. The flow booster may comprise a thruster.

The enclosure may comprise a net, and the net may be attached to the lower edge portion. In an alternative embodiment, the enclosure may comprise a net, and the net may be attached to the surrounding floating body, and in such a way that the liquid-tight wall is positioned on the inside of the net. In this embodiment, the lower edge portion may be attached to the net. This has the advantage of not allowing fish to swim in between the liquid-tight wall and the net.

The liquid-tight wall may form a cylindrical portion between the upper portion and the lower portion of the cage, and a bottom net extends downwards in the water column from the lower edge portion.

In the lower edge portion, the liquid-tight wall may be provided with a surrounding border, projecting inwards towards the center of the cage. The surrounding border may extend inwards for a fourth of the radius of the cage given by the upper portion of the cage. The surrounding border may extend inwards for a third of the radius of the cage given by the upper portion of the cage. The surrounding border may extend inwards for half the radius of the cage given by the upper portion of the cage. The surrounding border may extend inwards for more than half the radius of the cage given by the upper portion of the cage, such as for ⅔, ¾, ⅘ or even more.

In an upper wall portion, the liquid-tight wall may be provided with at least one closable opening for outflow of water from the upper portion of the cage, and the opening may be provided with a means for retaining the fish. The means may comprise a fine-meshed net or a grid. In a portion at a bottom ring, the liquid-tight wall may be provided with at least one closable opening for outflow of water from the upper portion of the cage, and the opening may be provided with a means for retaining the fish.

A cage for farming fish is also described, the cage forming an upper portion and a lower portion and the cage being floatable in a water column, the cage comprising:
- a surrounding floating body at the upper portion of the cage, the surrounding floating body being arranged to float in a water surface; and
- a liquid-tight wall between the upper portion and the lower portion of the cage; and
- the lower portion being liquid-tight and shaped like a truncated cone;
- at least one flow booster for creating a circular water current within the liquid-tight wall. The inlet of the cage may be formed of the free edge portion of the truncated cone at the point of the truncated cone, and the inlet may be provided with a first means for retaining the fish.

The point of the truncated cone may face downwards in the water column, and the inlet may be provided with an edge projecting upwards and surrounding the free edge portion so that a surrounding sludge trough is formed around the inlet.

The point of the truncated cone may face upwards in the water column so that a surrounding sludge trough is formed at the liquid-tight wall.

In an upper wall portion, the liquid-tight wall may be provided with at least one adjustable opening for outflow of water from the upper portion of the cage, and the opening may be provided with a second means for retaining the fish. The opening may be closable.

In the various exemplary embodiments, the liquid-tight wall may comprise a material in cloth form. In the various exemplary embodiments, the liquid-tight wall may comprise a rigid material. The rigid material may comprise fibreglass, a multi-layer material, concrete or a metal, such as steel. In the various exemplary embodiments, the border may comprise a material in cloth form. In the various exemplary embodiments, the border may comprise a rigid material. The rigid material may comprise fibreglass, a multi-layer material, concrete or a metal, such as steel.

BRIEF DESCRIPTION OF THE DRAWINGS

In what follows, examples of preferred embodiments are described, which are visualized in the accompanying drawings, in which.

DETAILED DESCRIPTION OF THE DRAWINGS

Figure 1:
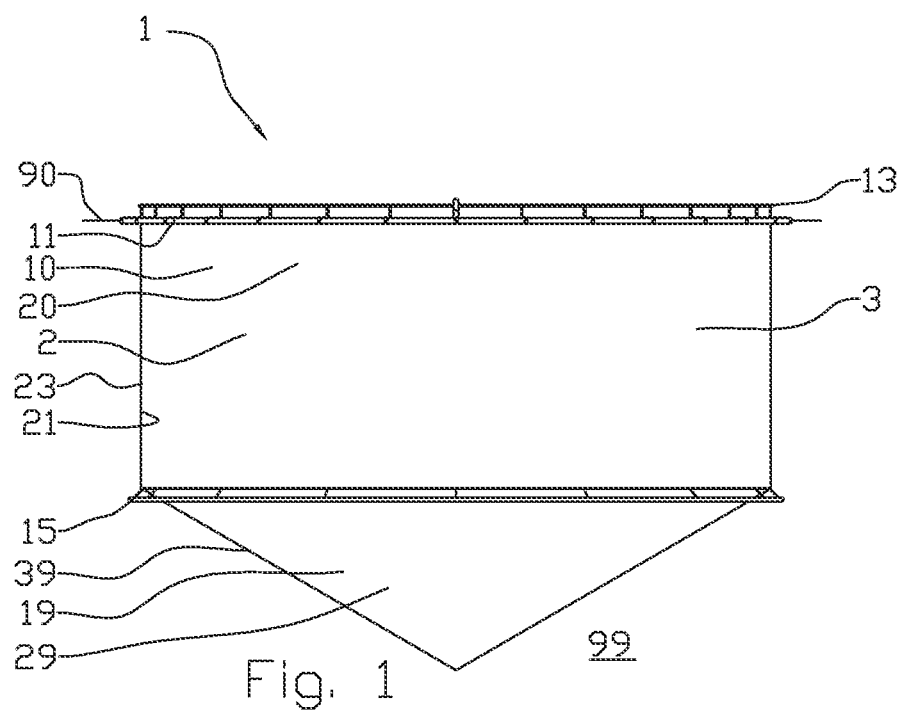
FIG. 1 shows a side view of a prior-art cage for fish-farming.
Figure 2:
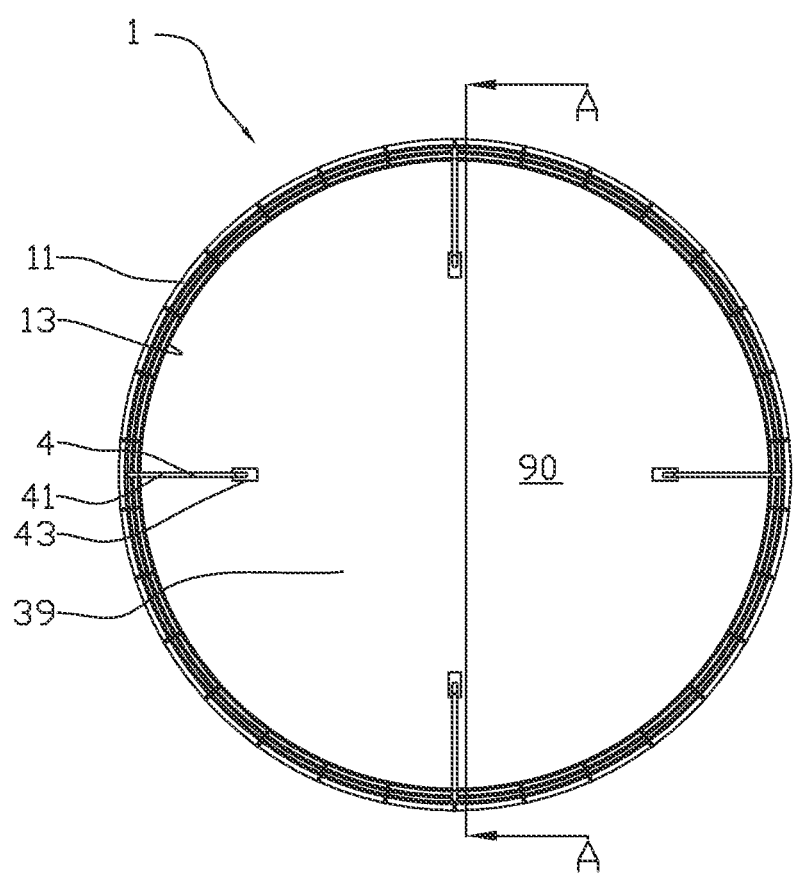
FIG. 2 shows, on the same scale as FIG. 1, a top view of a cage according to the invention.

In the figures, the reference numeral 1 indicates a cage for farming fish (not shown). A cage 1 according to the prior art is shown in FIG. 1. The cage 1 forms an upper portion 10 and a lower portion 19. The cage 1 is provided with a surrounding floating body 11 floating on a water surface 90 and keeping the cage 1 afloat in a water column 99. A railing 13 projects up from the surrounding floating body 11.

The cage 1 comprises a closed enclosure 2 forming a barrier to the fish, so that the fish cannot escape from the cage 1. The enclosure 2 forms an upper portion 20 and a lower portion 29, and the enclosure forms an inside 21 and an outside 23. The enclosure 2 may be formed of a net 3. The enclosure 2 is attached to the floating body 11, either directly to the floating body 11, or to the railing 13 or directly both to the floating body 11 and to the railing 13. The net 3 comprises a bottom net 39 which extends downwards in the water column 99 and may form the lower portion 29 of the enclosure 2.

The cage 1 includes a surrounding bottom ring 15. The enclosure 2 is attached to the bottom ring 15 and kept expanded by it.

The cage 1 according to the invention is shown in FIGS. 2 to 14. The cage 1 is provided with a flow booster 4 which creates a circular, substantially horizontal water current 40 inside the cage 1 (see FIG. 8). The flow booster 4 is shown with a holder 41. The flow booster 4 has an outlet 43. The flow booster 4 has an inlet 42 and may comprise a water jet that sucks water from the inside of the enclosure 2. The flow booster 4 may comprise an ejector which is supplied with a driving medium taken from the inside of the enclosure 2. In other embodiments, the flow booster 4 may comprise a propeller or a thruster.

Figure 3:
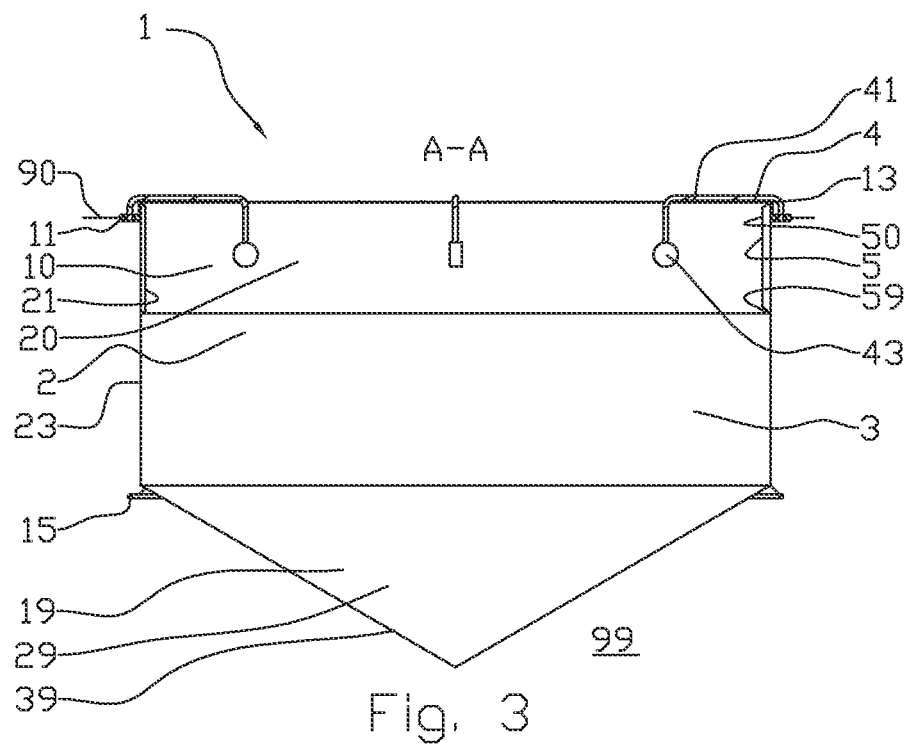
FIG. 3 shows a section through the cage according to a first embodiment.

In a first embodiment, the cage 1 comprises a liquid-tight wall 5 extending downwards in the cage 1 from the floating body 11 at the upper portion 10 of the cage 1. The liquid-tight wall 5 is positioned on the inside of the upper portion 20 of the enclosure 2, as shown in FIG. 3. The liquid-tight wall 5 may consist of a material in cloth form. The liquid-tight wall 5 may consist of a rigid material. The liquid-tight wall 5 is advantageously attached to the railing 13 in an upper portion 50, so that the upper portion 50 of the wall 5 projects above the water surface 90.

In FIG. 3, the distance between the net 3 and the liquid-tight wall 5 is exaggerated to show that the liquid-tight wall 5 is positioned on the inside of the upper portion 20. The liquid-tight wall 5 is attached, in a lower edge portion 59, to the enclosure 2 in such a way that fish in the cage 1 cannot swim in between the net 3 and the liquid-tight wall 5.

Figure 4:
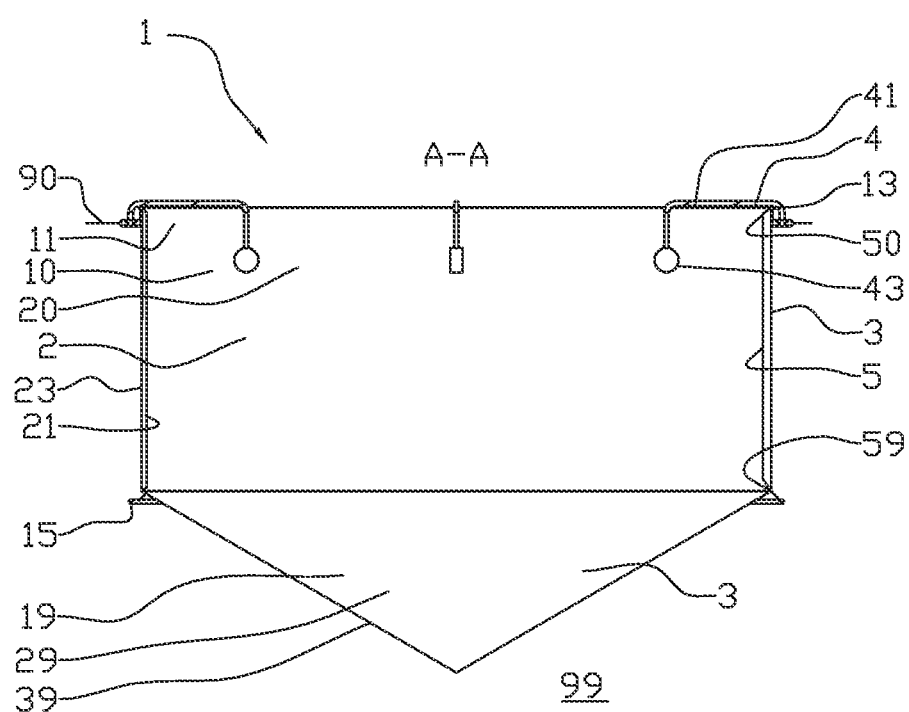
FIG. 4 shows a variant of the embodiment shown in FIG. 3.

FIG. 4 shows a variant of the first embodiment. The liquid-tight wall 5 is positioned on the inside of the enclosure 2. The liquid-tight wall 5 extends down to the bottom ring 15, so that the liquid-tight wall 5 forms the major part of the cylindrical portion of the cage 1. The liquid-tight wall 5 is attached, in the lower edge portion 59, to the enclosure 2 in such a way that fish in the cage 1 cannot swim in between the net 3 and the liquid-tight wall 5.

Figure 5:
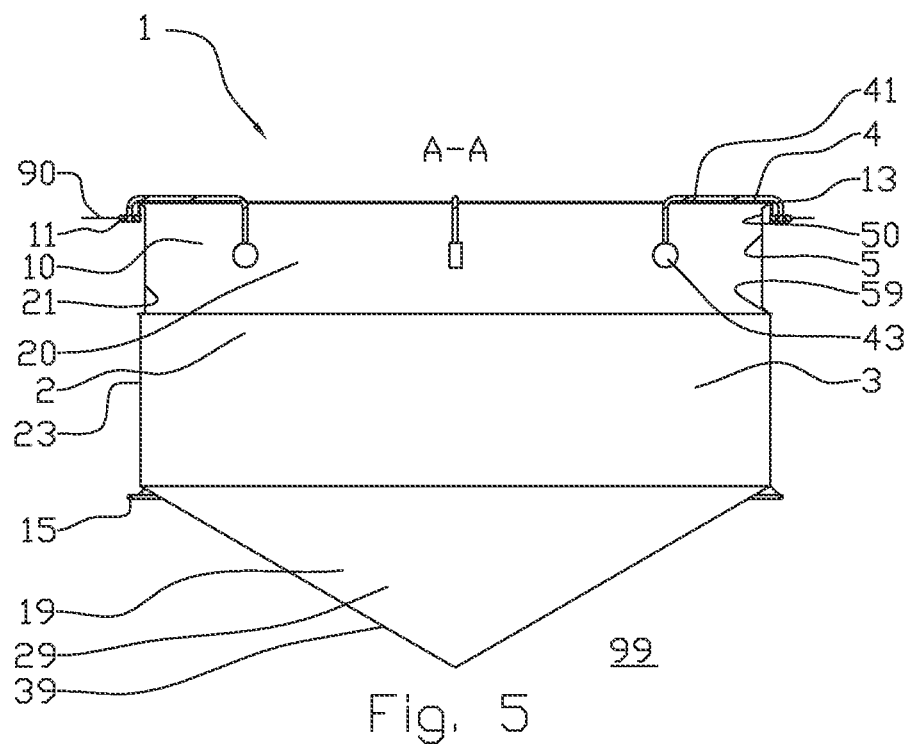
FIG. 5 shows a section through the cage according to a second embodiment.

In a second embodiment, the cage 1 comprises a liquid-tight wall 5 extending downwards in the cage 1 from the floating body 11 at the upper portion 10 of the cage 1. The liquid-tight wall 5 constitutes part of the upper portion 20 of the enclosure 2, as shown in FIG. 5. The liquid-tight wall 5 may consist of a material in cloth form. The liquid-tight wall 5 may consist of a rigid material. The liquid-tight wall 5 is advantageously attached to the railing 13 in an upper portion 50, so that the upper portion 50 of the wall 5 projects above the water surface 90. The net 3 is attached to the lower edge portion 59 of the wall 5. The net 3 extends from the edge portion 59 downwards in the water column 99, and the net 3 forms the lower portion 29 of the enclosure 2.

Figure 6:
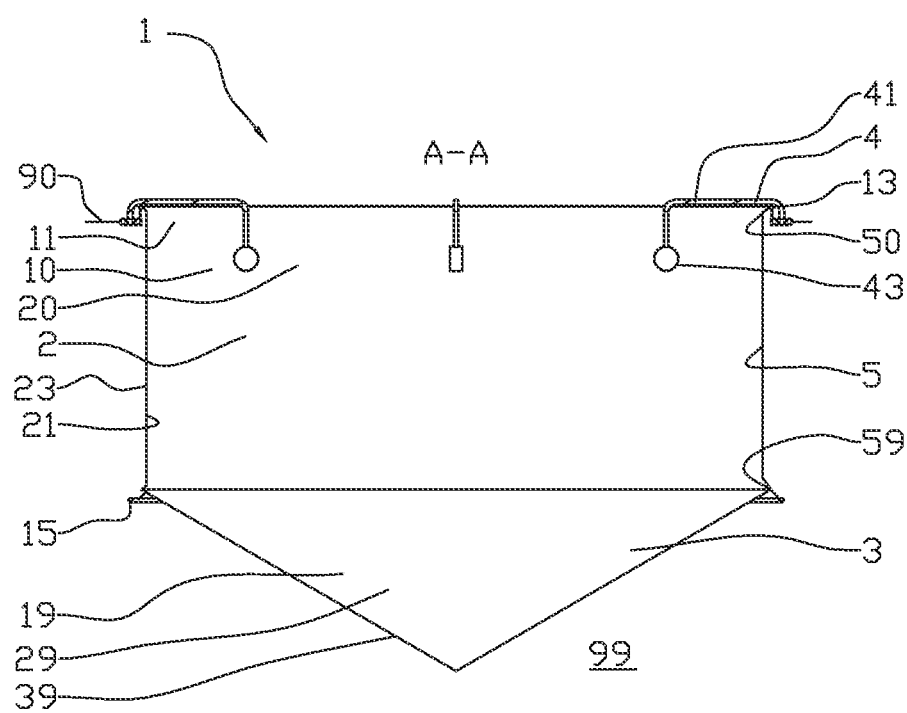
FIG. 6 shows a variant of the embodiment shown in FIG. 5.

FIG. 6 shows a variant of the second embodiment. The liquid-tight wall 5 extends down to the bottom ring 15 so that the liquid-tight wall 5 constitutes the major part of the cylindrical portion of the cage 1.

In a third embodiment, the cage 1 comprises a liquid-tight wall 5 extending downwards in the cage 1 from the floating body 11 at the upper portion 10 of the cage 1.

Figure 7:
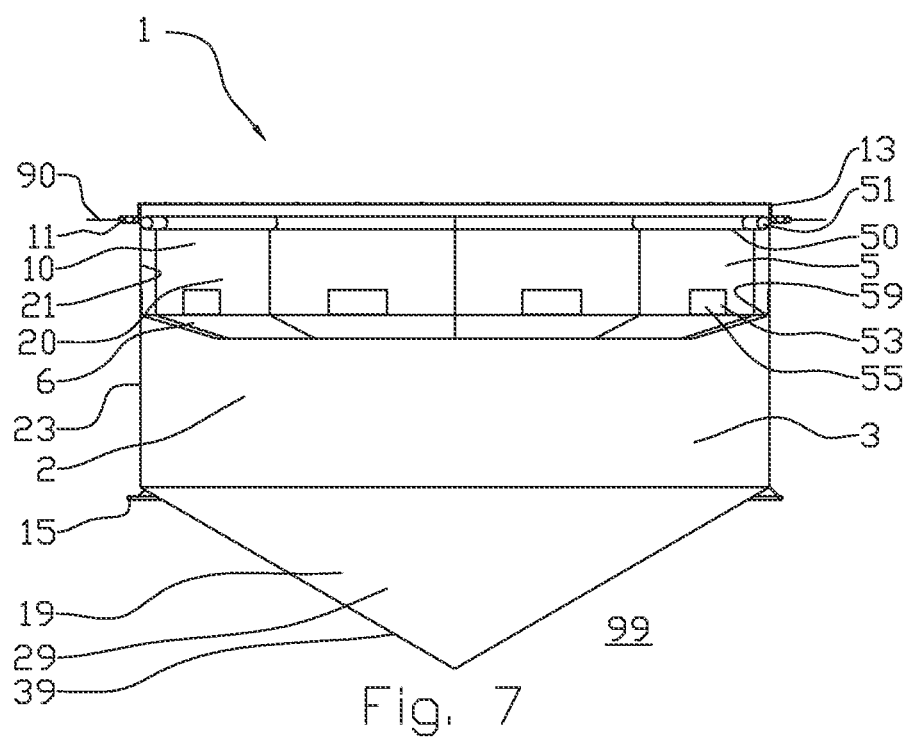
FIG. 7 shows a section through the cage according to a third embodiment.
Figure 8:
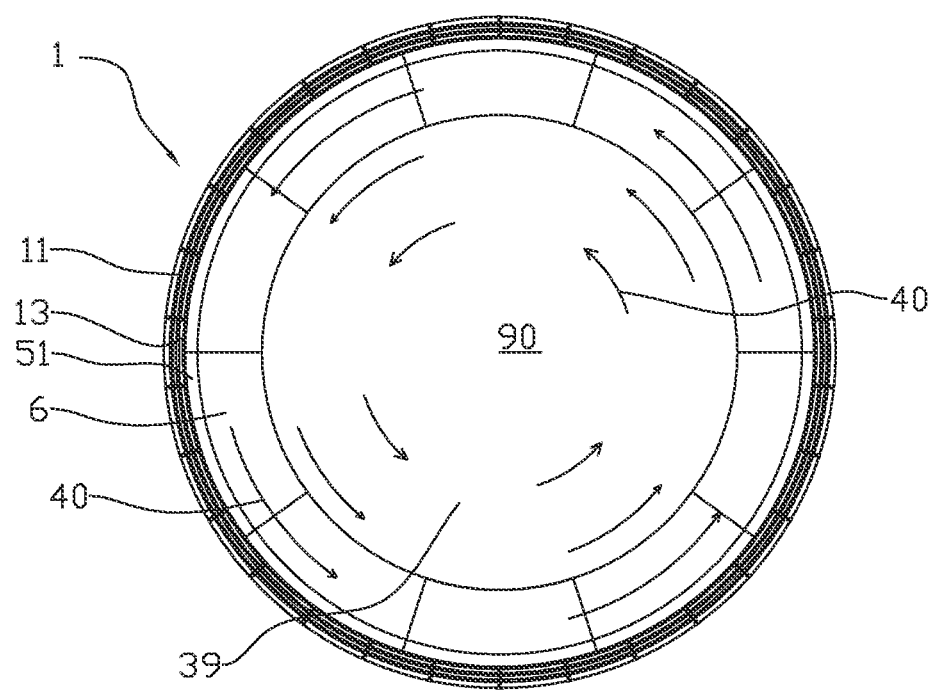
FIG. 8 shows, on the same scale, a top view of the same as FIG. 7, a horizontal water current being shown.

The liquid-tight wall 5 may consist of a material in cloth form. The liquid-tight wall 5 may consist of a rigid material. The rigid material may comprise fibreglass, a multi-layer material, concrete or a metal, such as steel. At its lower edge portion 59, the liquid-tight wall 5 is provided with a surrounding, inward border 6, as shown in FIGS. 7 and 8. The border 6 is attached to the lower edge portion 59 of the wall 5 as shown in FIG. 7.

In its upper portion 50, the liquid-tight wall 5 is attached to a floating ring 51. The floating ring 51 is positioned on the inside of the floating body 11. The floating ring 51 is dimensioned for having greater positive buoyancy than the floating body 11. This will be explained in what follows.

The liquid-tight wall 5 is provided with at least one opening 53. In the figures, a plurality of openings 53 is shown. The opening 53 is provided with a first means 55 for retaining the fish in the cage 1, so that the fish will not escape through the opening 53. The means 55 may comprise a fine-meshed net or a grid. The opening 53 can be adjusted, closed or opened by displacing a hatch (not shown) or some other tight barrier over the opening 53. The hatch or the barrier will control the amount of water that may flow through the opening 53. The openings 53 are shown positioned at the lower edge portion 59. The openings 53 may alternatively be positioned between the edge portion 59 and the floating ring 51. The openings 53 may be positioned at different heights along the circumference of the wall 5.

The flow booster 4 is not shown in FIGS. 7 and 8, but the cage 1 is provided with at least one flow booster 4 in this third embodiment.

The liquid-tight wall 5 constitutes a portion of the enclosure 2. In FIG. 7, it is shown that the wall 5 constitutes part of the upper portion 20 of the enclosure 2. The net 3 is attached to the lower edge portion 59.

Figure 9:
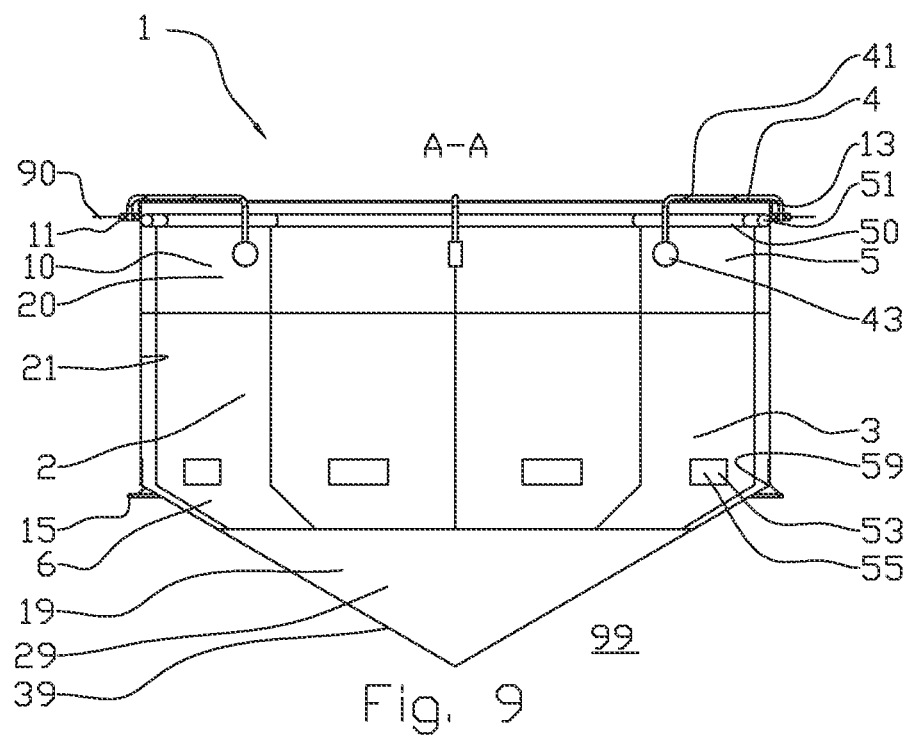
FIG. 9 shows a variant of the embodiment shown in FIG. 7.
Figure 10:
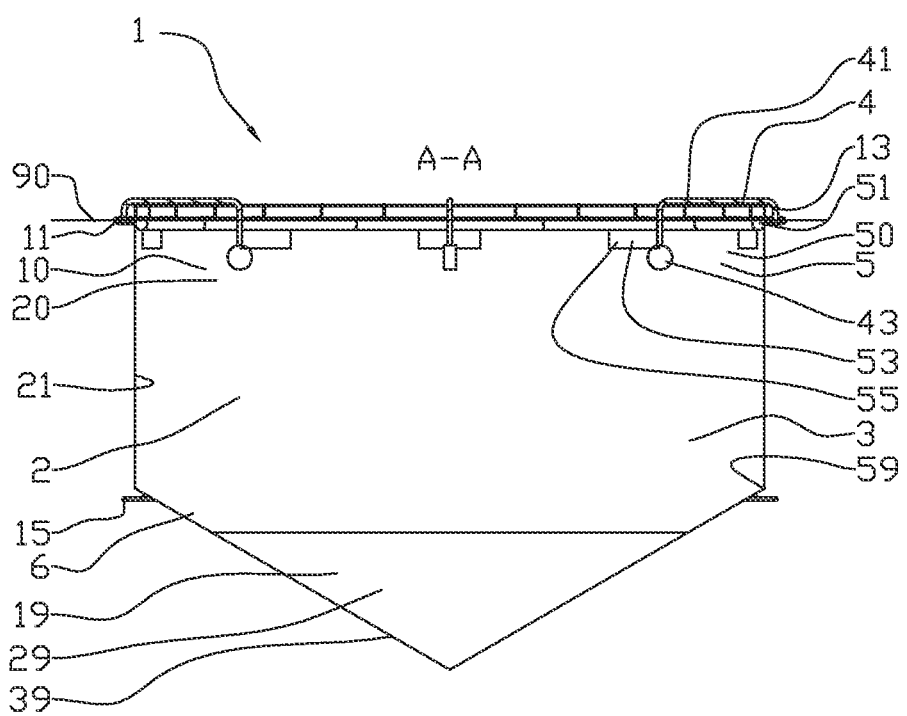
FIG. 10 shows a further variant of the embodiment shown in FIG. 7.

In a variant of the third embodiment, the wall 5 extends down to the bottom ring 15 so that the liquid-tight wall 5 constitutes the major part of the cylindrical portion of the cage 1, as shown in FIG. 9. The border 6 projects inwards in the lower portion 29 of the enclosure 2. The net 3 is attached to the lower edge portion 59 of the wall 5. In FIG. 9, it is shown that the closable opening 53 is positioned at the bottom ring 15 in this variant. In FIG. 10, it is shown that the closable opening 53 is positioned at the floating ring 51 in this variant.

In a fourth embodiment (not shown), the cage 1 comprises a liquid-tight wall 5 extending downwards in the cage 1 from the floating body 11 at the upper portion 10 of the cage 1. The liquid-tight wall 5 is positioned on the inside of the upper portion 20 of the enclosure 2 in the same way as that shown in FIG. 3. The enclosure 2 is attached to the floating body 11 and/or the railing 13 in the same way as that shown in FIG. 3. The liquid-tight wall 5 may consist of a material in cloth form. The liquid-tight wall 5 may consist of a rigid material. At its lower edge portion 59, the liquid-tight wall 5 is provided with a surrounding, inward border 6 in the same way as that shown in FIG. 7. The border 6 is attached to the lower edge portion 59 of the wall 5 in the same way as that shown in FIG. 7. In the lower edge portion 59, the liquid-tight wall 5 is attached to the enclosure 2 in such a way that fish in the cage 1 cannot swim in between the net 3 and the liquid-tight wall 5.

In a variant (not shown) of the fourth embodiment, the liquid-tight wall 5 is positioned on the inside of the enclosure 2. The liquid-tight wall 5 extends down to the bottom ring 15 so that the liquid-tight wall 5 constitutes the major part of the cylindrical portion of the cage 1. The liquid-tight wall 5 is attached, in the lower edge portion 59, to the enclosure 2 in such a way that fish in the cage 1 cannot swim in between the net 3 and the liquid-tight wall 5. The border 6 projects inwards in the lower portion 29 of the enclosure 2 as shown in FIGS. 9 and 10.

Figure 11:
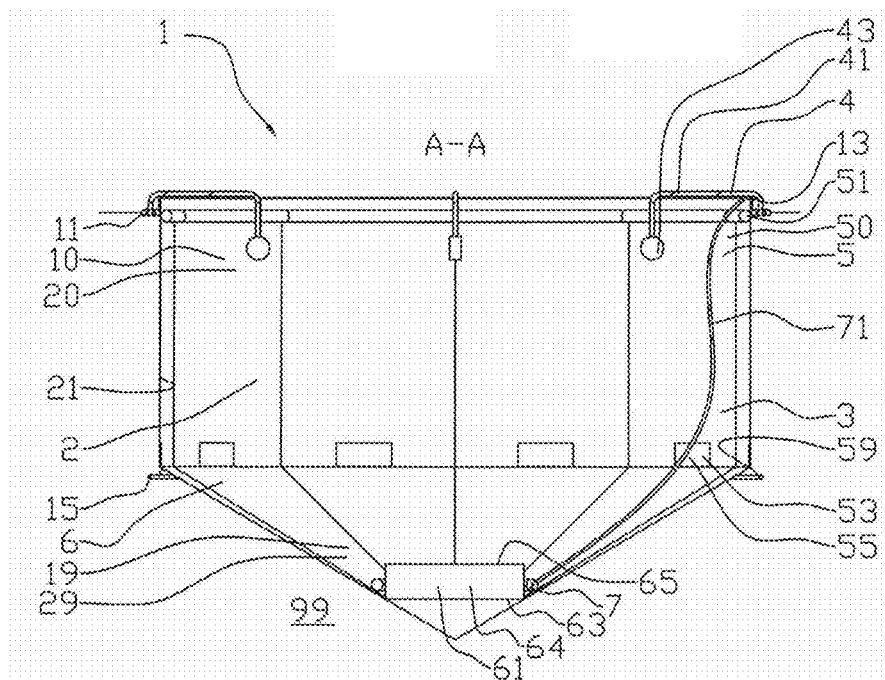
FIG. 11 shows a section through the cage according to a fourth embodiment.
Figure 12:
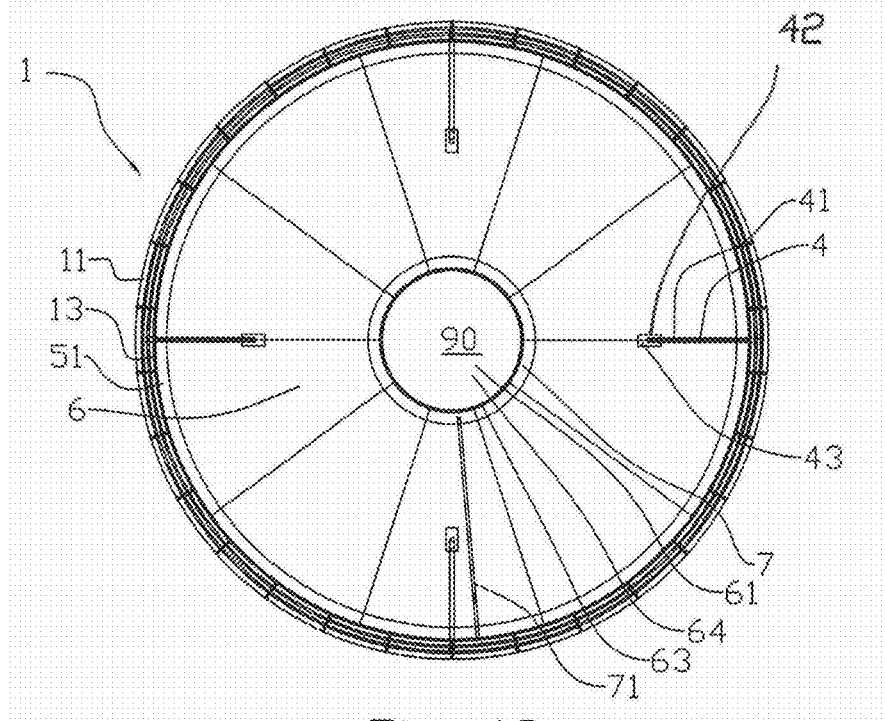
FIG. 12 shows, on the same scale, a top view of the same as FIG. 10.

In a fourth embodiment, the liquid-tight wall 5 extends down to the bottom ring 15 and the border 6 projects inwards in the lower portion 29 of the enclosure. The border 6 forms a center opening 61. The center opening 61 is provided with a surrounding frame 63 projecting upwards as shown in FIG. 11. The frame 63 forms a channel 64 through which water may flow. The channel 64 is provided with a second means 65 for retaining the fish in the cage 1, so that the fish will not escape through the channel 64. The second means 65 may comprise a fine-meshed net or a grid.

Figure 14:
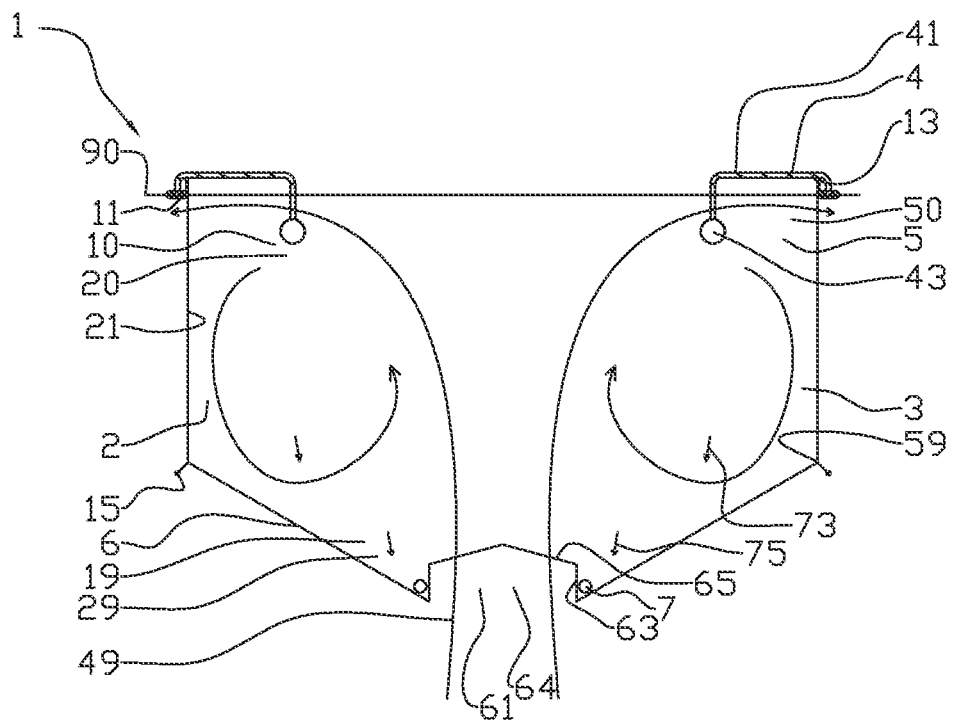
FIG. 14 shows a section through the cage as shown in FIG. 11 with schematic indication of a vertical entering water current and sedimentation of faecal matter and uneaten feed.

The frame 63 projecting upwards forms a sludge trough 7 between the frame 63 and the border 6. In this embodiment, the cage 1 is provided with a sludge collector (not shown) and a sludge hose 71 between the sludge trough 7 and the sludge collector. In FIG. 14, it is shown how faecal matter 73 and feed residues 75 sink towards the sludge trough 7.

Figure 13:
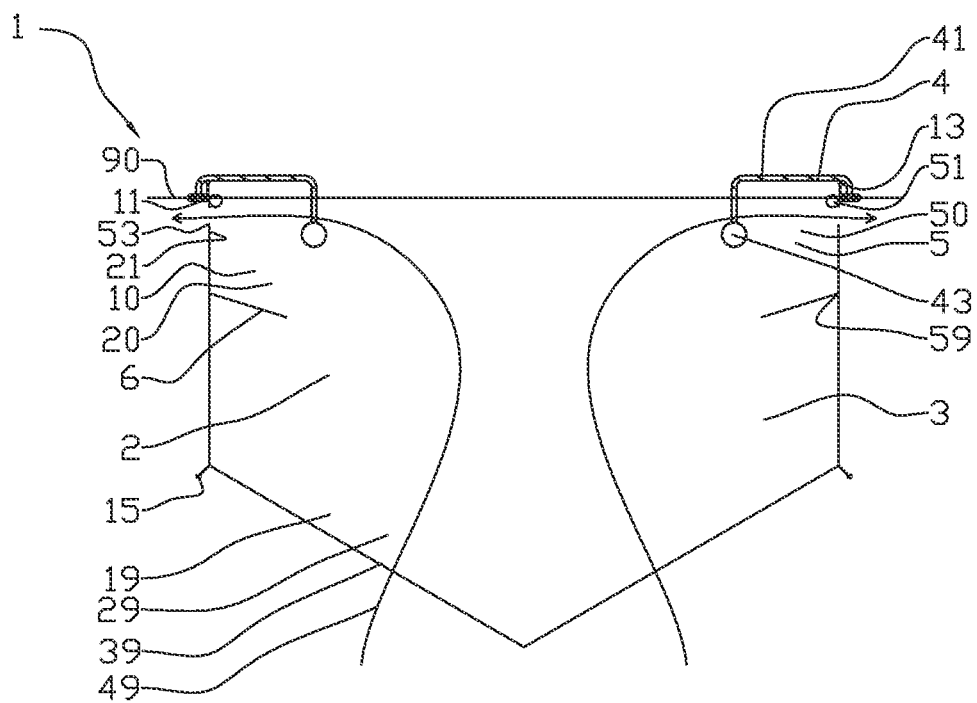
FIG. 13 shows a section through the cage as shown in FIG. 7 with schematic indication of a vertical water current.

According to the invention, the circular flow 40 will form a portion at the center of the cage 1 with a lower hydrodynamic pressure than the surrounding hydrodynamic pressure. This will create an upward water current 49 at the center of the cage 1 as shown in FIGS. 13 and 14. The upward water current 49 of fresh water enters at the center of the cage 1 in the lower portion 19 through the bottom net 39 as shown in FIG. 13, or through the second means 65 as shown in FIG. 14, and the water flows out of the openings 53 in the upper portion 10 of the cage 1, where the hydrodynamic pressure on the inside 21 of the wall 5 is higher than on the outside 23.

The inward-projecting border 6 has the advantage of allowing a circular water current 40 along the circumference of the cage to be created with a lower energy consumption. The water current 40 will have a larger extent in the cage 1; this is to say, the water current 40 comprises a larger volume of the cage 1 in comparison to when flow boosters 4 are used in a cage 1 without a border 6. The well-being of fish in the cage 1 will be improved because of the circular water current 40 that the fish will have to swim against, and because of the circular water current 40 forming an upward, central water current 49 which supplies the cage 1 with fresh water from the surroundings at the lower portion 19 of the cage 1.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A cage for farming fish, the cage forming an upper portion and a lower portion and the cage floating in a water column, the cage comprising:
   a surrounding floating body at the upper portion of the cage, the surrounding floating body being arranged to float in a water surface; and
   an enclosure between the upper portion and the lower portion of the cage, the enclosure being closed in the lower portion of the cage, and the enclosure forming an inside and an outside, wherein
   the cage is provided with a liquid-tight wall at the upper portion, and said liquid-tight wall being attached to the floating body and extending from the water surface downwards in the water column, the liquid-tight wall forming a lower edge portion; and
   the cage is provided, in the upper portion of the cage, with at least two flow boosters for creating a circular water current within the liquid-tight wall to create a higher hydrodynamic pressure along the liquid-tight wall and a lower hydrodynamic pressure at the center of the cage, the flow boosters each having an inlet located entirely above the lower edge portion of the liquid-tight wall and being supplied with water from a portion within the inside of the liquid-tight wall in the upper portion of the cage, wherein the cage is adapted for an upward water current to enter the cage at the center of the cage in the lower portion.

2. The cage according to claim 1, wherein the enclosure comprises a net, and wherein the net is attached to the lower edge portion.

3. The cage according to claim 1, wherein the enclosure comprises a net, the net being attached to the surrounding floating body and the liquid-tight wall being positioned on an inside of the net.

4. The cage according to claim 1, wherein the enclosure comprises a net, the net being attached to the surrounding floating body, and wherein the liquid-tight wall is positioned on an outside of the net.

5. The cage according to claim 3, wherein the lower edge portion is attached to the net.

6. The cage according to claim 2, wherein the liquid-tight wall constitutes a cylindrical portion between the upper portion and the lower portion of the cage, and the net further comprises a bottom net which extends downwards in the water column from the lower edge portion.

7. The cage according to claim 1, wherein the liquid-tight wall is provided, in the lower edge portion, with a surrounding border projecting inwards towards the center of the cage.

8. The cage according to claim 7, wherein the surrounding border extends inwards for a fourth of the radius of the cage given by the upper portion of the cage.

9. The cage according to claim 1, wherein the liquid-tight wall is provided, in an upper portion, with at least one closable opening for outflow of water from the upper portion of the cage, and the opening is provided with a means for retaining the fish.

10. A method for creating an upward central water current of fresh water inside an enclosure in a cage for farming fish, the cage forming an upper portion and a lower portion and the cage floating in a water column, the cage comprising:
    a surrounding floating body at the upper portion of the cage, the surrounding floating body being arranged to float in a water surface; and
    an enclosure between the upper portion and the lower portion of the cage, the enclosure being closed in its lower portion, and the enclosure forming an inside and an outside,
    wherein the method comprises
    providing the cage at the upper portion with a liquid-tight wall which is attached to the floating body, and which extends from the water surface downwards in the water column, and the liquid-tight wall forms a lower edge portion;
    providing the cage, in its upper portion, with at least two flow boosters each having an inlet located entirely above the lower edge portion of the liquid-tight wall and are supplied with water from the inside of the liquid-tight wall of the enclosure to create a circular water current within the liquid-tight wall; and
    wherein the circular water current creates a portion at the center of the cage in the lower portion of the cage with a lower hydrodynamic pressure than the ambient pressure, so that water flows into the lower portion of the cage below the edge portion and upwards in the cage in the upward water current, the cage is adapted for the upward water current to enter the cage at the center of the cage in the lower portion.

11. The method according to claim 10, wherein the circular water current creates a hydrodynamic pressure which is greater than the ambient pressure at the periphery of the cage so that the water flows out of the cage through an opening in the liquid-tight wall.

12. The cage according to claim 3, wherein the liquid-tight wall constitutes a cylindrical portion between the upper portion and the lower portion of the cage, and the net further comprises a bottom net which extends downwards in the water column from the lower edge portion.

13. The cage according to claim 4, wherein the liquid-tight wall constitutes a cylindrical portion between the upper portion and the lower portion of the cage, and the net further comprises a bottom net which extends downwards in the water column from the lower edge portion.

14. The cage according to claim 5, wherein the liquid-tight wall constitutes a cylindrical portion between the upper portion and the lower portion of the cage, and the net further comprises a bottom net which extends downwards in the water column from the lower edge portion.

15. The cage according to claim 2, further comprising providing the liquid-tight wall, in the lower edge portion, with a surrounding border projecting inwards towards the center of the cage.

16. The cage according to claim 3, further comprising providing the liquid-tight wall, in the lower edge portion, with a surrounding border projecting inwards towards the center of the cage.

17. The cage according to claim 5, further comprising providing the liquid-tight wall, in the lower edge portion, with a surrounding border projecting inwards towards the center of the cage.

18. The cage according to claim 6, further comprising providing the liquid-tight wall, in the lower edge portion, with a surrounding border projecting inwards towards the center of the cage.

* * * * *